United States Patent
Palanisamy et al.

(10) Patent No.: US 11,947,431 B1
(45) Date of Patent: Apr. 2, 2024

(54) REPLICATION DATA FACILITY FAILURE DETECTION AND FAILOVER AUTOMATION

(71) Applicant: Dell Products, L.P., Hopkinton, MA (US)

(72) Inventors: Kumaravel Palanisamy, Bangalore (IN); Rashmi Shashidhar, Bangalore (IN)

(73) Assignee: Dell Products, L.P., Hopkinton, MA (US)

( * ) Notice: Subject to any disclaimer, the term of this patent is extended or adjusted under 35 U.S.C. 154(b) by 0 days.

(21) Appl. No.: 18/062,808

(22) Filed: Dec. 7, 2022

(51) Int. Cl.
*G06F 11/20* (2006.01)
*G06F 16/28* (2019.01)

(52) U.S. Cl.
CPC ........ *G06F 11/2007* (2013.01); *G06F 16/285* (2019.01); *G06F 2201/85* (2013.01)

(58) Field of Classification Search
CPC .................................................. G06F 11/2007
See application file for complete search history.

(56) References Cited

U.S. PATENT DOCUMENTS

| | | | |
|---|---|---|---|
| 7,526,668 B2 * | 4/2009 | Shitomi | G06F 11/2097 714/3 |
| 8,099,622 B2 * | 1/2012 | Shitomi | G06F 11/2097 714/3 |
| 10,552,060 B1 * | 2/2020 | Don | G06F 3/061 |
| 2002/0156984 A1 * | 10/2002 | Padovano | G06F 11/201 711/148 |
| 2009/0271445 A1 * | 10/2009 | Emaru | G06F 11/2069 |
| 2017/0373926 A1 * | 12/2017 | Shang | H04L 43/10 |
| 2021/0073089 A1 * | 3/2021 | Sathavalli | G06F 9/45558 |

* cited by examiner

*Primary Examiner* — Amine Riad
(74) *Attorney, Agent, or Firm* — Anderson Gorecki LLP

(57) ABSTRACT

An autonomous system for detecting primary site failure on a Replication Data Facility (RDF) and automating failover to a destination site includes a replication data facility health monitor on a destination site that monitors a plurality of health indicators of the primary site. Example health indicators include RDF session state of RDF sessions on the replication data facility, and reachability of a set of IP addresses. Example IP addresses include an IP address of a cluster master node on the primary site, IP addresses of all of the cluster nodes on the primary site, and IP addresses of Network Attached Storage (NAS) servers executing on the cluster nodes. The replication data facility health monitor generates a replication configuration and, upon detection of a failure of the replication data facility at the primary site, uses the replication configuration to automate failover of all of the NAS servers to the destination site.

20 Claims, 10 Drawing Sheets

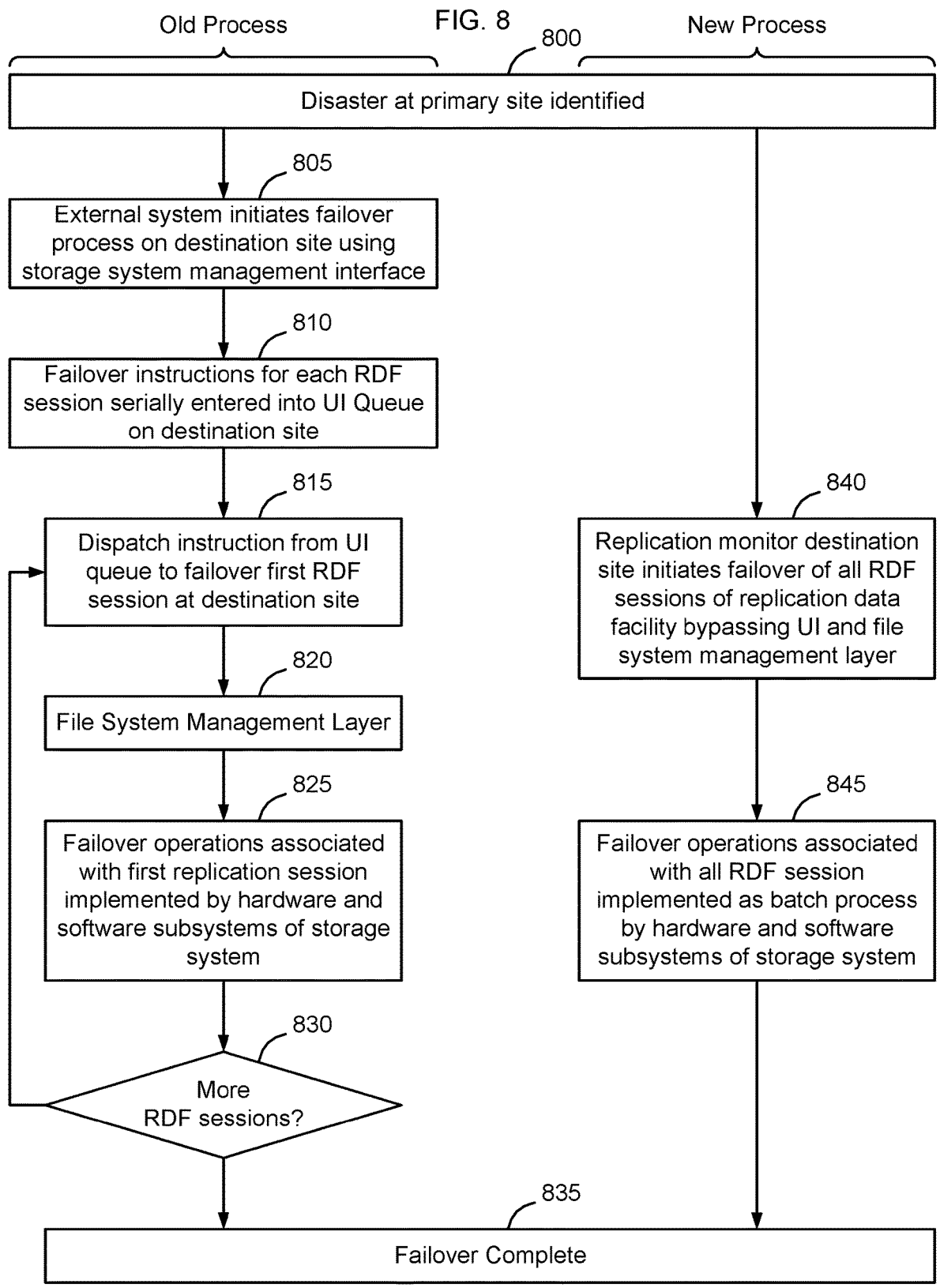

FIG. 9

```
if replication_sessions_available                                          ⎫
    generate the replication configuration                                 ⎬ 900 ping_response = ping the remote_clu_IP                                 ⎫
    while ping_response -eq 0                                              ⎪
    do                                                                     ⎬ 905
        recompute the ping_response                                        ⎪
        continue                                                           ⎪
    done                                                                   ⎭ if ping_response -ne 0; then                                           ⎫
        Check if the File RDF groups are in partitioned/TI state. If so,   ⎪
        Check if the ping to the dpNetwork IPs go through. If not,         ⎬ 910
        Check if the nasserver IPs are pingable. If not,                   ⎪
        Raise a flag for the disaster detected                             ⎭

Pass control to the disaster recovery module                       ⎫
        Obtain list of replication session by replication configuration builder ⎬ 915
        Failover the replication sessions in parallel                      ⎭ fi
fi
```

FIG. 10

|  | External Monitor | RDF health monitor and disaster recovery system |
|---|---|---|
| Number of RDF sessions | 4 | 4 |
| Disaster occurrence time | 23 Aug 2022 11:56:31 UTC | 23 Aug 2022 12:23:40 UTC |
| Disaster recovery start time | 23 Aug 2022 12:01:31 UTC | 23 Aug 2022 12:23:42 UTC |
| Disaster recovery end time | 23 Aug 2022 11:01:57 UTC | 23 Aug 2022 12:23:56 UTC |
| Recovery Time | 26 seconds | 14 seconds |
| Return to operation | 326 seconds | 16 seconds |

FIG. 11

|  | External Monitor | RDF health monitor and disaster recovery system |
|---|---|---|
| Number of RDF sessions | 10 | 10 |
| Disaster occurrence time | 24 Aug 2022 06:20:03 UTC | 24 Aug 2022 07:04:58 UTC |
| Disaster recovery start time | 24 Aug 2022 06:25:03 UTC | 24 Aug 2022 07:05:00 UTC |
| Disaster recovery end time | 24 Aug 2022 06:25:44 UTC | 24 Aug 2022 07:05:28 UTC |
| Recovery Time | 41 seconds | 28 seconds |
| Return to operation | 341 seconds | 30 seconds |

REPLICATION DATA FACILITY FAILURE DETECTION AND FAILOVER AUTOMATION

BACKGROUND

This disclosure relates to computing systems and related devices and methods, and, more particularly, to an autonomous system for detecting primary site failure on a replication data facility and automating failover to a destination site on the replication data facility.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

All examples and features mentioned below can be combined in any technically possible way.

An autonomous system for detecting primary site failure on a Replication Data Facility (RDF) and automating failover to a destination site on the replication data facility is provided. In some embodiments, a replication data facility health monitor on a destination site is used to monitor a plurality of health indicators of the primary site. Example health indicators, in some embodiments, include RDF session state of all RDF sessions between the primary site and destination site, an IP address of a cluster master node on the primary site, IP addresses of all of the cluster nodes on the primary site, and IP addresses of Network Attached Storage (NAS) servers executing on the cluster nodes. The replication data facility health monitor generates a replication configuration and, upon detection of a failure of the replication data facility, uses the replication configuration to automate failover of all of the NAS servers to the destination site.

BRIEF DESCRIPTION OF THE DRAWINGS

FIG. 8 is a flow chart comparing a conventional failover process and the method of detecting occurrence of disaster at the primary site and performing recovery to the destination site, according to some embodiments.

FIG. 9 is a table containing pseudocode configured to implement a RDF health monitor and disaster recovery system, according to some embodiments.

FIGS. 10 and 11 are tables comparing recovery time after occurrence of a disaster using an external monitoring system, with recovery time after occurrence of a disaster using the RDF health monitor and disaster recovery system, according to some embodiments.

DETAILED DESCRIPTION

This disclosure is based, at least in part, on the realization that it would be advantageous to provide an autonomous system for detecting failure at a primary site on a replication data facility, and for automating failover to a destination site on the replication data facility.

Figure 1:
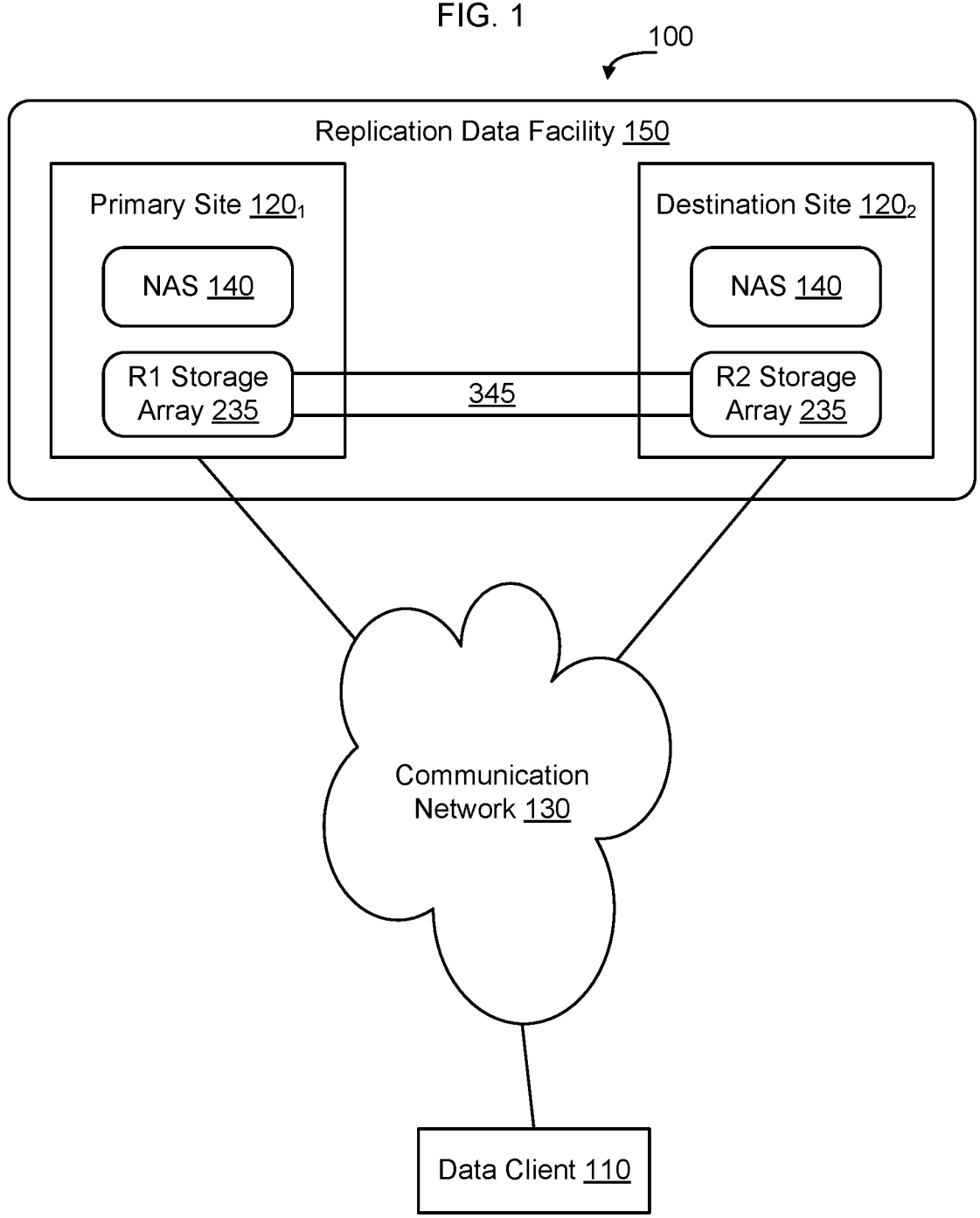
FIG. 1 is a functional block diagram of an example storage environment including a replication data facility, according to some embodiments.

FIG. 1 is a functional block diagram of an example storage environment 100. As shown in FIG. 1, in storage environment 100, a data client 110 may access storage resources provided by one or more storage systems 120 over a communication network 130. In some embodiments, the communication network 130 is an Internet Protocol (IP) communication network 130 enabling transmission of IP data packets through the communication network 130, although other forms of communication networks may be used to interconnect the data client 110 with storage systems 120 depending on the implementation.

Data from the data client 110 is stored in the storage resources of the storage systems 120. Storage resources that are accessed by a data client 110 over a communication network 130 are referred to herein as Network Attached Storage (NAS) 140. In some embodiments, each storage system 120 has a storage array 235 of physical storage resources, which are abstracted to the data client 110 by NAS servers running on the storage systems 120.

To provide enhanced reliability, in some embodiments two or more storage systems are configured to implement a replication data facility 150, such that data from data client 110 may be stored in storage resources 235 of a primary site (storage system 1201) and replicated to a destination site (storage system 1202). If a failure occurs at the primary site 1201, on communication network 130, or elsewhere, which renders the data client 110 unable to access the filesystem at the primary site 1201, the data client 110 is able to access the filesystem on the destination site 1202.

Figure 2:
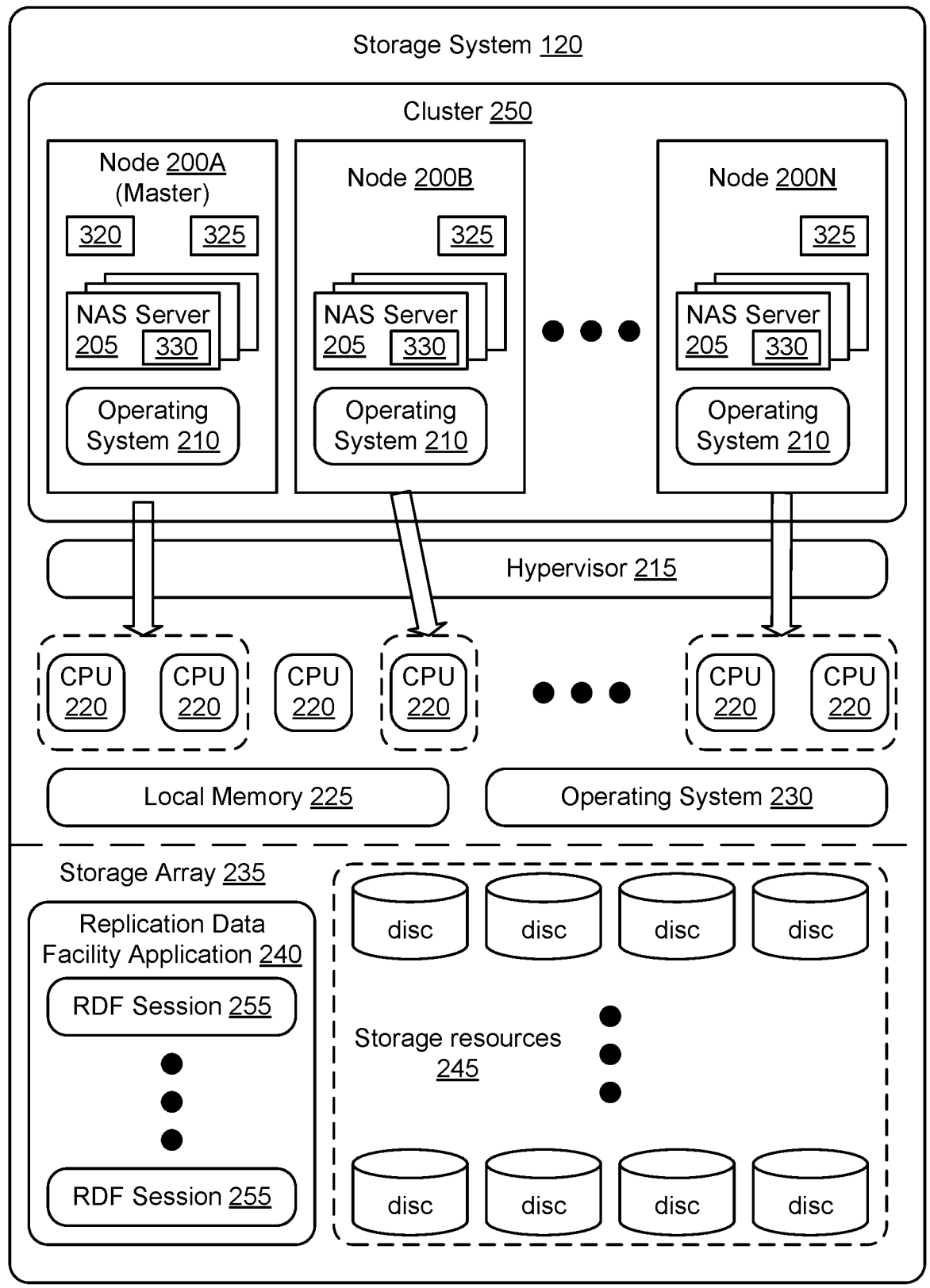
FIG. 2 is a functional block diagram of an example storage system for use in the storage environment of FIG. 1, according to some embodiments.

FIG. 2 is a functional block diagram of an example storage system 120 for use in the storage environment 100 of FIG. 1. As shown in FIG. 2, the storage system 120 has physical resources including a number of CPU processor cores 220, local memory 225, a storage array 235 including storage resources 245, and other physical resources. A hypervisor 215 abstracts the physical resources of the storage system 120 from nodes 200, and allocates physical resources of storage system 120 for use by the nodes 200. In some embodiments, a set of nodes 200A-200N on a given storage system 120 are organized as a cluster 250. One of the nodes (200A in FIG. 2) is the master node in the cluster 250.

Each node 200 has an operating system 210 and one or more application processes running in the context of the operating system. As shown in FIG. 2, in some embodiments, one or more of the nodes 200 instantiated on storage system 120 implements one or more NAS servers 205 to enable the node 200 to provide data access to the data client 110 on the communication network 130. Although FIG. 2 shows the NAS servers 205 executing in virtual machines, it should be understood that one or more of the NAS servers 205 may execute directly in the context of the storage system operating system 230, for example in containers loaded to the storage system operating system 230.

As shown in FIG. 2, in some embodiments a Replication Data Facility (RDF) application 240 is provided to enable data managed by the NAS servers 205 to be replicated from the primary site to a destination site on a replication data facility 150. The RDF application 240 causes all the filesystem data on the NAS server to be completely replicated by the storage array 235 to one or more similar destination storage arrays 235 on the replication data facility 150.

It is possible for a primary storage array 235 (R1) to perform data replication to a destination storage array 235 (R2) where the storage systems 120 are compatible and properly configured. The RDF application 240, when executed on storage system 120, enables the storage array 235 to participate in storage system level data replication between sets of mirroring pairs of storage systems 120. A set of storage arrays 235 that are configured for data replication will be referred to herein as a "Replication Data Facility 150". The primary site of the RDF 150 is also referred to herein as a R1 site, and the destination site of the RDF 150 is also referred to herein as a R2 site. A given storage system, such as storage system 120, may operate as a primary site R1 or destination site R2 in many mirroring pairs, and hence multiple RDF applications 240 may simultaneously execute on storage system 120 to control participation of the storage array 235 in the mirroring operations. Within a given replication data facility 150, a set of RDF sessions 255 may be implemented. For example, in some embodiments, a respective RDF session 255 is used to replicate data of each respective NAS server 205 to the destination site on a given replication data facility 150.

Data transfer among storage systems, including transfers between storage arrays 235 for data replication (mirroring) functions, may take place in several ways depending on how the primary storage system handles data written by the data client 110 and how the destination storage system acknowledges receipt of data on the replication data facility. Two example data mirroring modes will be referred to herein as synchronous (SYNC) and asynchronous (ASYNC).

In a synchronous data replication mode, data is transmitted from the primary storage array R1 to the destination storage array R2 as the data is received from the data client 110, and an acknowledgement of a successful write is transmitted by the destination storage array R2 synchronously with the completion thereof. To maintain a synchronous relationship between the primary storage array R1 and the destination storage array R2, each IO from the data client 110 is forwarded by the primary storage array R1 to the destination storage array R2 as it is received from data client 110, and the primary storage array R1 will wait for an acknowledgment from the destination storage array R2 before issuing a subsequent IO from the data client 110.

In an asynchronous data replication mode, when data is received from the data client 110, the data is written to the primary storage array R1 and a data transfer process is initiated to write the data to the destination storage array R2 on the replication data facility. The primary storage array R1 acknowledges the write operation to the data client 110 before the primary storage array R1 has received an acknowledgement that the data has been received by the destination storage array R2. The use of asynchronous data replication enables the data on the primary storage array R1 and destination storage array R2 to be one or more cycles out of synchronization, because the primary storage array R1 will continue to execute IOs prior to receipt of acknowledgments from the destination storage array R2. The use of asynchronous replication may be beneficial in connection with sites located geographically distant from each other, for example where the distance between the primary storage array R1 and the destination storage array R2 is such that waiting for an acknowledgement from the destination storage array R2 would take considerable time and, hence, reduce responsiveness of the primary storage array R1 to the data client 110.

The channel used to transfer data between the storage arrays on a replication data facility 150 is referred to herein as RDF links 345. In some embodiments, RDF links 345 are implemented using two links for redundancy. In some embodiments, data transfers between storage arrays 235 on RDF links 345 are implemented over Fibre Channel, over an IP network, or using another communication medium.

In some replication data facilities 150, the primary R1 site is used to service IO operations from the data client 110, and the R2 site is used as a destination site for data replication on the replication data facility 150. In the event of a failure of the primary R1 site, responsibility for servicing IO operations from the data client can switch to the destination site to provide the data client 110 with continued access to the data client's data. The process of changing responsibility for servicing IO operations from the data client 110 from the primary site to the destination site is referred to herein as "failover". After failover, the destination site becomes responsible for servicing IO operations from the data client 110. In embodiments where multiple NAS servers 205 are executing at the primary site, failing over the primary site to the destination site requires each of the RDF sessions 255 to be failed over to start a corresponding NAS server 205 on the destination site.

When the primary site fails, data that is being protected by the replication data facility 150 is unavailable to the data client 110 until failover is completed. The data client 110 is also referred to herein as a "host." This Data Unavailable (DU) status has a business impact on the host, since the host is not able to execute transactions on the data associated with the replication data facility 150. For example, if the data is associated with processing banking or other financial transactions, the host will be prevented from executing these types of transactions until failover completes.

Some replication data facilities 150 are monitored using an external monitoring system that is configured to detect failure of the primary site and to enable failover operations to be started on the destination site. This has several downsides. For example, some external monitoring systems take a finite amount of time to both detect occurrence of a disaster at the primary site and then to start failover operations on the destination site. Further once the external monitoring system detects failure of the primary site, failover operations on the destination site are required to be passed by the external monitoring system through a management system interface on the destination site. Where there are multiple NAS servers 205 that are required to be failed over from the primary site to the destination site, failover operations of each of the NAS servers 205 are implemented serially by the external monitoring system, which can result in a longer recovery time. In instances where human involvement is required to both detect unavailability of the primary array R1 and perform disaster recovery operations manually on the destination array R2, the period of data unavailability can be extended even further. Additionally, since the external monitoring system relies on separate software that needs to be maintained, changes to the software used on the storage arrays can require corresponding updates and maintenance changes to the external monitoring software.

According to some embodiments, an RDF health monitor and disaster recovery system 315 is included as part of a cluster management stack 300. The RDF health monitor 365 on the destination site R2 monitors the health of the primary site R1 and, when disaster conditions are detected at the primary site R1, the disaster recovery system 360 automatically implements disaster recovery on the destination site R2, to failover all NAS servers associated with the set of RDF sessions 255 affected by the failure to the destination site R2. In this manner, the need for failover is automatically detected and implemented by the destination site R2 to minimize the amount of time that the host experiences Data Unavailability.

Figure 3:
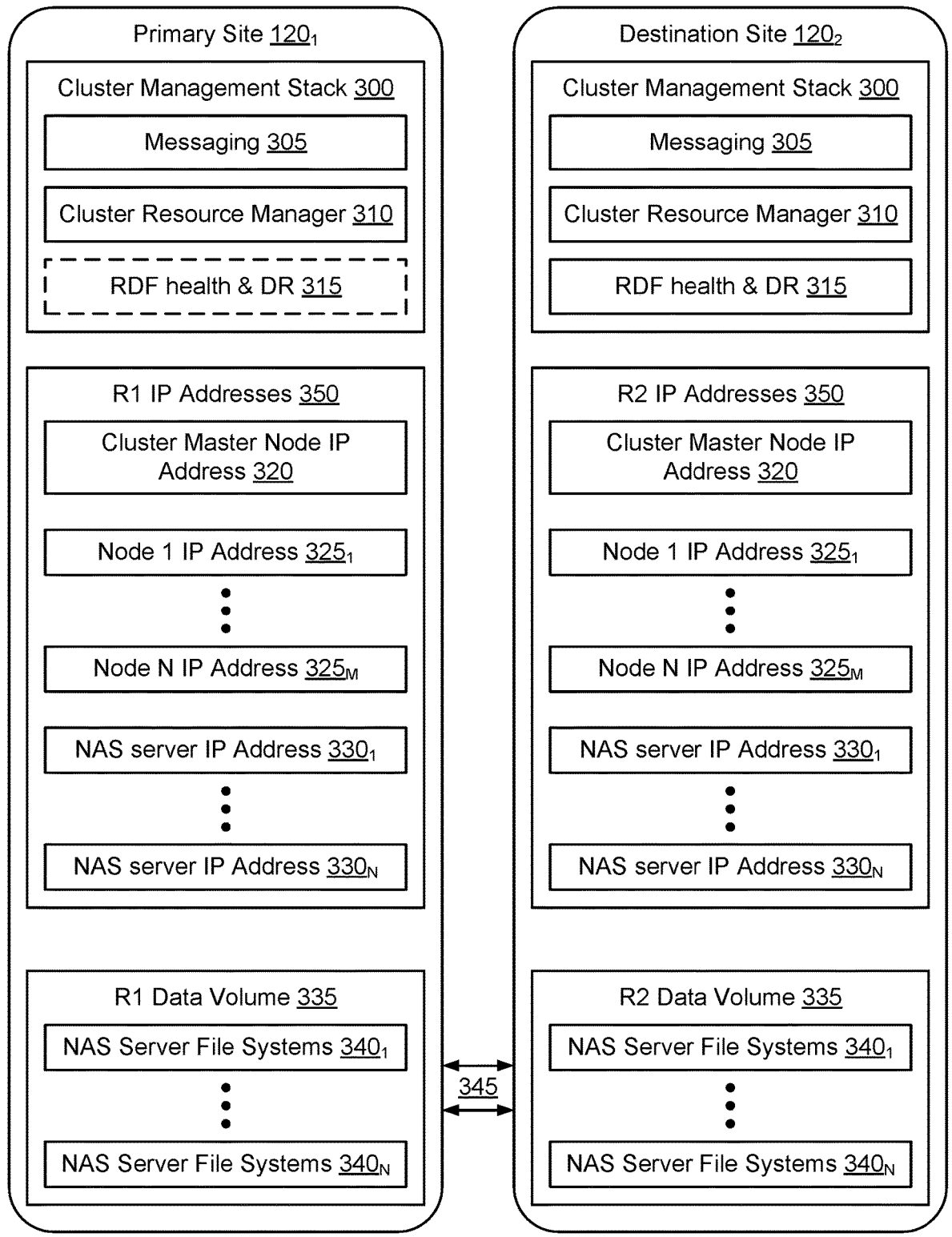
FIG. 3 is a functional block diagram of a replication data facility including a primary site and a destination site interconnected by RDF links, according to some embodiments.

FIG. 3 is a functional block diagram of a replication data facility including a primary site R1 and a destination site R2 interconnected by redundant RDF links 345, according to some embodiments.

As shown in FIG. 3, in some embodiments the primary and destination storage arrays each include a cluster management stack 300. The cluster management stack 300 might include multiple components, such as a messaging module 305, and a cluster resource manager 310. An example cluster messaging module 305 might be implemented, for example, using Corosync which is an open-source program that provides cluster membership and messaging capabilities, often referred to as a messaging layer, to client servers. An example cluster resource manager 310 might be implemented, for example, using Pacemaker which is an open-source system that coordinates resources and services that are managed and made highly available by a cluster. The messaging module 305 thus enables nodes 200 on a given site to communicate as a cluster 250, while the cluster resource manager 310 provides the ability to control how the cluster behaves. When a cluster 250 is set up, the master node is provisioned with a cluster master node IP address 320, and each node in the cluster (including the master node) is provisioned with a node IP address 325 that is used, for example by the messaging module 305, to exchange messages between the nodes 200 and used by the cluster resource manager 310 to control behavior of the cluster nodes 200.

Each node 200 has one or more NAS servers 205 that manages one or more filesystems 340 which are grouped in a R1 replication data group 335 to be replicated on the replication data facility 150 over RDF links 345. Each NAS server 205 has a NAS server IP address 330 that enable the NAS server to be accessed. As shown in FIG. 3, in some embodiments the primary site R1 IP addresses 350 thus includes the cluster master node IP address 320, the node IP addresses $325_1$-$325_M$, and the NAS server IP addresses $330_1$-$330_N$.

In some embodiments, the destination site includes an RDF health monitor and disaster recovery system 315. The primary site may also include an RDF health monitor and disaster recovery system 315, depending on the implementation. The RDF health monitor and disaster recovery system 315 enables the destination site to monitor the health of the primary site on the replication data facility. In the context of a replication data facility, in some embodiments the RDF health monitor 315 on the destination array R2 is used to monitor the primary array R1 to detect disaster conditions at the primary array R1. "Disaster" as that term is used herein, is used to refer to any condition that requires failover of the NAS servers 205 that are providing access to data contained in the replication data group 335 from the primary array R1 to the destination array R2. Example disaster conditions might be a loss of power at the primary array R1, a failure at the primary array R1, a network outage that prevents access to the primary array R1, or numerous other conditions. By enabling the destination site to monitor the primary site on a replication data facility, and to automate disaster recovery on the destination array R2, it becomes possible to ensure rapid failover in the event of a disaster at the primary site.

Although FIG. 3 shows a replication data facility that includes only two sites (R1 and R2) it should be understood that other types of replication data facilities might involve more than two sites and, as such, the configuration shown in FIG. 3 and described in greater detail herein is intended to be illustrative rather than limiting.

Figure 4:
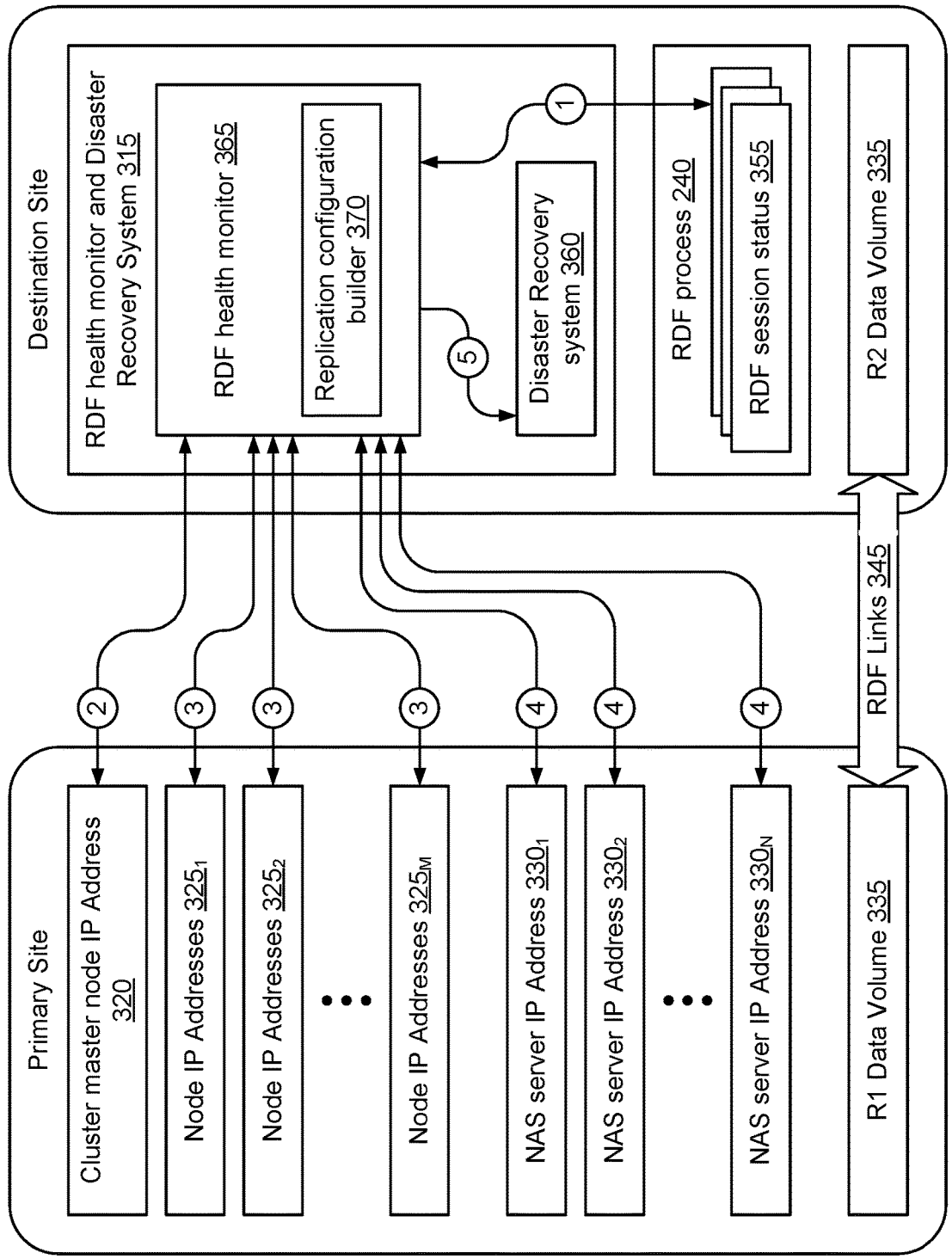
FIG. 4 is a functional block diagram of a replication data facility including an autonomous system for detecting occurrence of disaster at the primary site and performing recovery to the destination site, according to some embodiments.

FIG. 4 is a functional block diagram of a replication data facility including an autonomous system for detecting occurrence of disaster at the primary site and performing recovery to the destination site, according to some embodiments. As shown in FIG. 4, in some embodiment the cluster management stack 300 of the destination site includes RDF health monitor 365 and Disaster Recovery system 360. The disaster recovery system 360 is also referred to herein as a failover manager. In some embodiments, the RDF health monitor 365 contains control logic to check the status of the RDF session state (arrow 1), the reachability of the cluster IP address (arrow 2), the reachability of the node IP address 325 (arrow 3), and the reachability of the NAS server IP addresses 330 (arrow 4). In the event that these checks identify a disaster at the primary array R1, the cluster management software 300 instructs the failover manager 360 to implement failover of the replication data facility to the destination site (arrow 5). Example IP address reachability checks may be implemented, for example, using ping. Other ways of determining the reachability of the IP addresses may be used as well depending on the implementation.

In some embodiments, the RDF health monitor and disaster recovery system 315 includes a replication configuration builder 370. The replication configuration builder 370 builds a replication configuration description for each replication data facility 150. An example process of creating a replication configuration is described in connection with FIG. 7.

In some embodiments, the RDF health monitor and disaster recovery system 315 is implemented as a systemd service on the destination storage array. Systemd is a system and service manager for Linux operating systems. By implementing the RDF health monitor and disaster recovery system 315 as a systemd service, it is guaranteed of auto-failover of the service upon the service failure and upon local node failover. Hence, this service is guaranteed of high availability.

Figure 5:
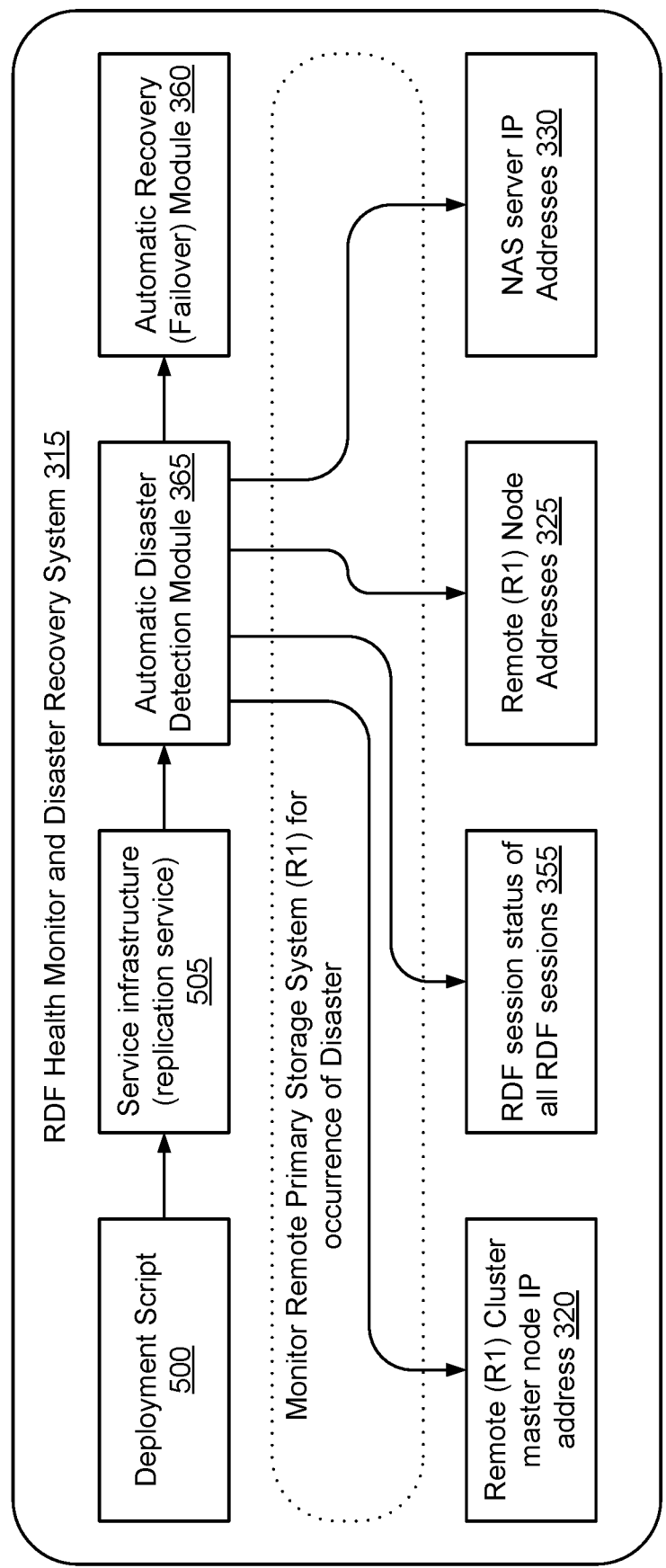
FIG. 5 is a functional block diagram of an example autonomous system for detecting occurrence of disaster at the primary site and performing recovery to the destination site, according to some embodiments.

FIG. 5 is a functional block diagram of an example RDF health monitor and Disaster Recovery System 315 for detecting occurrence of disaster at the primary site and performing recovery to the destination site, according to some embodiments. As shown in FIG. 5, in some embodiments the destination storage system includes a deployment script 500 that is used to install (for new deployment) or upgrade (for existing deployment) the service infrastructure of the destination site, such as to modify the replication service 505 of the destination site, to enable the RDF health monitor 365 and automatic recovery (failover) module 360 to be deployed to be integrated into the cluster management stack 300 of the destination site.

Extending the cluster management stack 300 to incorporate the RDF health monitor 365 is transparent to the user. Specifically, since the RDF health monitor 365 runs as part of the cluster management stack 300, users of the storage system do not need to configure any external monitoring software to enable RDF sessions to be monitored by the storage system where the RDF health monitor is installed. Any array that is upgraded to include the RDF health monitor 365 will be able to monitor the primary sites on the RDF sessions where the array is the destination site, and initiate failover in instances where disaster conditions at the primary site are detected. By integrating the RDF health monitor 365 as part of the cluster management stack 300, the RDF health monitor is able to be included and deployed as a cluster management stack upgrade, and once installed, can automatically start monitoring any RDF sessions that exist at the time of installation where the site is acting as the destination site on the RDF sessions.

For example, as shown in FIG. 5, in some embodiments a deployment script 500 is used to install the automatic disaster detection module 365 to the CRM stack 300 of a storage array. The storage array has a replication service 505 executing thereon which provides details about replication data facilities existing on the storage array. As new replication data facilities are configured or modified, the service infrastructure 505 provides the updated details to the automatic disaster detection module 365. The replication data facility details are used to build replication configuration that is used to specify a set of RDF sessions and a set of IP addresses to be monitored by the RDF health monitor 365. The replication configuration is also used, by the automatic recovery module 360, to automate the failover of the set of RDF sessions of a replication data facility in the event a disaster is detected at the primary site.

In some embodiments, the automatic disaster detection module 365 monitors the RDF session status of all RDF sessions 255. In response to a determination that all of the RDF sessions are in a partitioned state, the disaster detection modules determines where any of the R1 IP addresses 350 configured for the replication data facility are reachable. For example, the disaster detection module 365 determines the reachability of the cluster master node IP address 320, reachability of the node IP address of the nodes on the primary site 325, and reachability the IP addresses of the NAS servers 330 associated with the replication data facility. In some embodiments, if the status of all of the RDF sessions 255 is "partitioned", i.e., the R1 and R2 sites are not reachable via the RDF link 345, the automatic disaster detection module 365 checks to determine any of the IP addresses are reachable. If none of the R1 IP addresses 350 are reachable, the automatic disaster detection module 365 determines that the primary site R1 is in a disaster condition, and the automatic recovery module 360 uses the replication configuration associated with the replication data facility to perform failover operations for all NAS servers 205 associated with the replication data facility 150.

Figure 6:
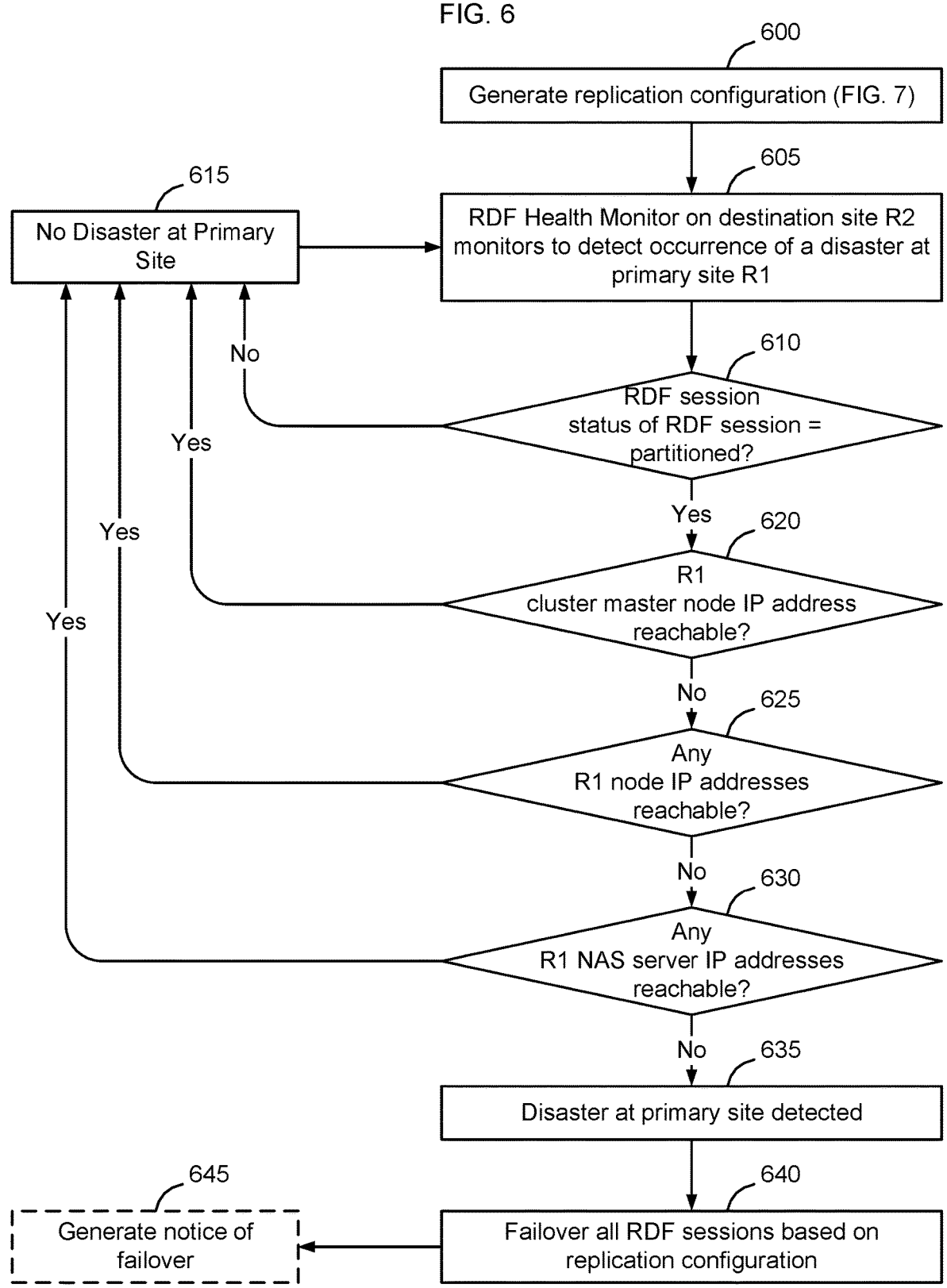
FIG. 6 is a flow chart showing an example method of detecting occurrence of disaster at the primary site and performing recovery on the destination site, according to some embodiments.

FIG. 6 is a flow chart showing an example method of detecting occurrence of disaster at the primary site and performing recovery on the destination site, according to some embodiments. In some embodiments, when the storage array is configured to operate as a destination site (R2 array) in a replication data facility, the automatic disaster detection module 365 interacts with the services infrastructure 505 to generate a replication configuration for the replication data facility (block 600). An example process of building a replication configuration for the replication data facility (block 600) is described in greater detail in connection with FIG. 7. In some embodiments, the automatic disaster detection module builds a replication configuration (block 600) for every replication data facility where the storage array will participate in the replication data facility as a destination site. The replication data facilities may connect the destinate site R2 with multiple primary sites R1 on different replication data facilities.

Once a replication configuration has been generated for a given replication data facility, the RDF health monitor 365 on the R2 storage array begins monitoring the primary site on the replication data facility (block 605). In some embodiments, the RDF health monitor 365 monitors the RDF session status of all RDF sessions 255 associated with the replication data facility 150 (block 610). As noted above, in some embodiments each NAS server 205 on the primary site is associated with a respective RDF session 255 on the replication data facility 150.

In some embodiments, the RDF health monitor 365 determines whether the session status of one of the RDF sessions 255 has a status of "partitioned" (block 610). In some embodiments, a status of "partitioned" is used to describe a session status 355 where the R1 and R2 storage arrays are not able to communicate with each other on the RDF session 255. If one RDF session 255 has a status of partitioned, in some embodiments all RDF sessions will have a status of partitioned since all RDF sessions use the same RDF links. If the session status 355 of an RDF session 255 is not "partitioned", (a determination of NO at block 610) the R1 and R2 storage arrays are still able to communicate using the RDF sessions 255 and, accordingly, the RDF health monitor 365 determines that the primary site is not experiencing disaster (block 615). Accordingly, the RDF health monitor 365 continues monitoring the RDF sessions of the replication data facility.

If the RDF session 255 has a session status of "partitioned", in some embodiments the RDF health monitor 365 determines if the cluster master node IP address 320 on the primary site is reachable (block 620). For example, in some embodiments the RDF health monitor 365 sends a ping to the cluster master node IP address 320 of the master node on the primary site and waits for a ping response. Ping is a computer network administration software utility used to test the reachability of a host on an Internet Protocol network. It is available for virtually all operating systems that have networking capability, including most embedded network administration software. In response to a determination that the cluster master node IP address 320 is active, for example when the RDF health monitor 365 receives a ping response (a determination of YES at block 620), the RDF health monitor 365 determines that the R1 storage array is not experiencing a disaster (block 615), and the RDF health monitor 365 continues monitoring the primary site of the replication data facility.

In some embodiments, in response to a determination that the cluster IP address 320 is not reachable, for example when the RDF health monitor 365 does not receive a ping response (a determination of No at block 620), the RDF health monitor 365 determines whether any of the node IP addresses 325 of the nodes 200 on the primary site are reachable (block 625). If any of the node IP addresses 325 are reachable (a determination of YES at block 625), the RDF health monitor 365 determines that the primary site is not experiencing a disaster (block 615), and the RDF health monitor 365 continues monitoring the primary site of the replication data facility.

In response to a determination that none of the node IP address 325 are reachable (a determination of NO at block 625), in some embodiments the RDF health monitor 365 determines whether any of the NAS server IP addresses 330 are reachable (block 630). If any of the NAS server IP addresses 330 are reachable (a determination of YES at block 630), the RDF health monitor 365 determines that the primary site is not experiencing a disaster (block 615), and the RDF health monitor 365 continues monitoring the primary site of the replication data facility.

In response to a determination that all of the NAS server IP addresses of the RDF session are not reachable (a determination of NO at block 630), the RDF health monitor 365 determines that the R1 storage array is in a disaster condition (block 635). In response to the determination that the primary site is in a disaster condition (block 635) the RDF health monitor 365 calls the automatic recovery (failover) module 360 to failover all RDF sessions 255 to the destination site (block 640). In some embodiments, failover is based on the replication configuration created in block 600, and is implemented to failover all RDF sessions 255 in parallel. Once failover has started, a notification may be provided to a storage administrator (block 645) for example via a user interface of a storage system management application.

Although FIG. 6 shows some embodiments in which the automatic disaster detection module 365 monitors the RDF session status and then determines the reachability of the IP addresses associated with the replication data facility, it should be understood that the automatic disaster detection module 365 may also be configured to periodically check the reachability of some or all of the IP addresses associated with the replication data facility prior to determining the session status of the RDF sessions. Further, in some embodiments, the order in which the reachability of the IP addresses is determined may be changed, or pings may be sent to all of the IP addresses in parallel to accelerate determination of the existence of disaster conditions at the primary site.

Figure 7:
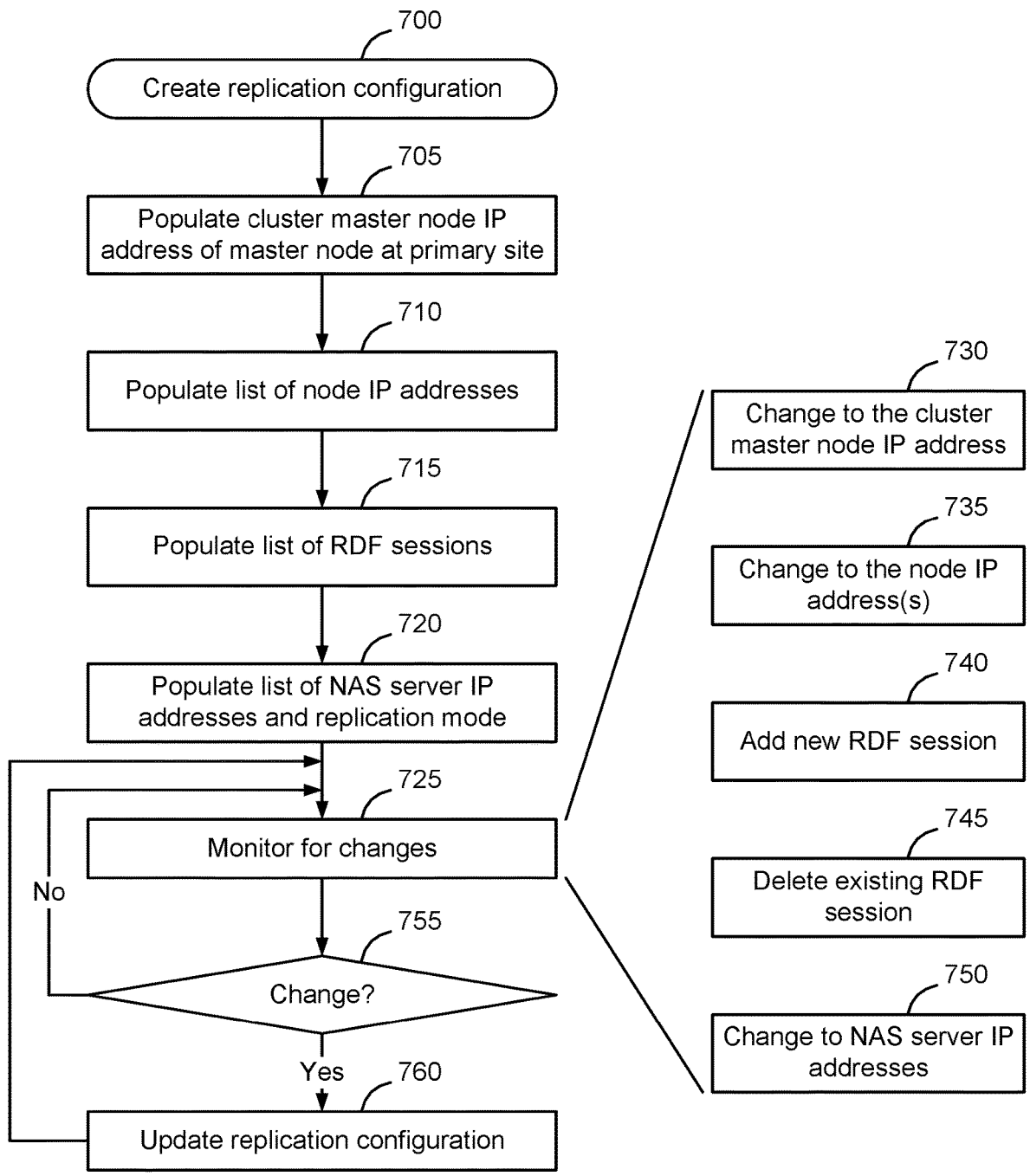
FIG. 7 is a flow chart showing an example method of creating a replication configuration for use by the destination site to recover from a disaster at the primary site, according to some embodiments.

FIG. 7 is a flow chart showing an example method of creating a replication configuration for use by the destination site to recover from a disaster at the primary site, according to some embodiments. According to some embodiments, when the RDF health monitor 365 is started or when a new replication data facility is started, a replication configuration builder module 370 of the RDF health monitor populates a list of the R1 IP addresses 350 at the primary site associated with the replication data facility. As shown in FIG. 3, in some embodiments the R1 IP addresses associated with the replication data facility include the cluster master node IP address 320, the node IP addresses 325, and the NAS server IP addresses 330. In some embodiments, the cluster master node IP address 320 and the node IP addresses 325 are referred to as control network IP addresses. It should be understood that the master node has two control network IP addresses—both the cluster master node IP address 320 and a node IP address 325. In some embodiments, the replication configuration builder module 370 also prepares a list of the associated NAS server details such as NAS server IP addresses 330 and the mode (Synchronous RDF or Asynchronous RDF) of the replication session.

For example, as shown in FIG. 7, in some embodiments when the replication configuration builder starts to build a replication configuration (block 700) the replication configuration builder populates the replication configuration to include a cluster master node IP address 320 of the R1 storage array (block 705). The replication configuration builder also populates the replication configuration to include a list of the node IP addresses 325 of the R1 storage array (block 710). The replication configuration builder creates a list of RDF sessions 255 of the replication data facility (block 715). For each RDF session 255, the replication configuration builder also populates replication configuration to include other details, for example the NAS server IP addresses 330 and the replication mode (block 720).

Once the replication configuration is created for a given replication data facility 150, the RDF health monitor 365 monitors for changes to the R1/R2 RDF configuration (block 725). Example changes might include a change to the cluster master node IP address 320 (block 730), a change to the node IP addresses 325 (block 735), addition of a new RDF session 255 (block 740), deletion of an existing RDF session 255 (block 745), or changes to the NAS server IP addresses 330 (block 750). While there are no changes detected (a determination of NO at block 755) the RDF health monitor 365 continues monitoring. If a change is detected (a determination of YES at block 735) the replication configuration is updated to reflect the new configuration information (block 760), and then the RDF health monitor 365 continues monitoring for subsequent changes.

FIG. 8 is a flow chart comparing a conventional disaster detection and failover process implemented using an external disaster monitoring system (left hand column, including blocks 805-830), and the method of using an autonomous system on the destination site for detecting occurrence of disaster at the primary site and performing recovery to the destination site (right-hand column, including blocks 840-845), according to some embodiments.

As shown in FIG. 8, using an external monitoring system, if a disaster is identified at the primary site (block 800), the external monitoring system initiates the failover process on the destination R2 storage array, however the failover operations are passed through the management stack and the failover instructions are required to be implemented serially. These individual RDF session failover instructions are entered into a user interface queue on the R2 storage array (block 810), from which they are dispatched to be implemented on the R2 storage array (block 815). Since the failover instructions are dispatched from the storage system management system, the failover instructions are first passed to a file system management layer (block 820).

Upon receipt of the instruction to failover a first of the RDF sessions of the replication data facility, the hardware and software subsystems of the R2 storage array implement the failover operations to effect failover of the first RDF session (block 825). In instances where there are multiple RDF session (a determination of YES at block 830), this process is serially implemented for each of the RDF sessions (blocks 815-830) until all RDF session failover instructions have been dispatched from the UI queue and implemented on the array. Once all RDF sessions have been failed over to the R2 storage array (a determination of NO at block 830) failover is complete (block 835). In instances where an external monitoring system is not being used, a user would need to detect the disaster on the R1 storage array (block 800) and initiate failover through a user interface manually, which can add time associated with both identifying occurrence of a disaster (block 800) as well as increasing the amount of time it takes to enter instructions to failover all associated RDF sessions after identifying occurrence of a disaster at the primary site (block 805).

The process on the right-hand side of FIG. 8 shows a process implemented using an autonomous system for detecting primary site failure on a replication data facility 150 and automating failover to a destination site on the replication data facility 150. As shown in FIG. 8, when a disaster at the primary site is identified by the RDF health monitor (block 800), the replication monitor on the destination side initiates failover of all RDF sessions to the destination array in parallel. Since the failover manager 360 is implemented as a systemd service, the failover manager is able to issue syscalls to implement the failover operations thus bypassing the user interface and file system management layers, which expedites processing of the failover operations (block 840). Further, many of the failover operations are able to be implemented as a group by the software and hardware systems to enable failover of all RDF sessions in parallel (block 845). Once all failover operations have completed, failover is complete (block 835).

FIG. 9 is a table containing pseudocode configured to implement the RDF health monitor and disaster recovery system, according to some embodiments. In FIG. 9, the pseudocode shows some embodiments in which the cluster master node IP address is primarily monitored and, if the cluster master node IP address 320 is not responsive, the RDF session status is then determined. It should be understood that the order of these operations may be changed, for example as shown in FIG. 7, to first check the RDF session status to detect if the RDF group has a status of partitioned prior to determining the reachability of the cluster master node IP address 320.

As shown in FIG. 9, in some embodiments, if replication sessions (replication data facilities) are available, e.g., the site is a destination site in one or more replication data facilities, replication configurations are built for each replication session (instructions 900). For each replication session, Ping is used to monitor the reachability of the cluster master node IP address 320 of the primary site (instructions 905). If the destination site does not receive a ping response from the cluster master node IP address 320, the destination site checks to determine if all of the RDF sessions in an RDF group associated with the replication data facility 150 are in a partitioned state. If the RDF group is partitioned, the destination site sends a ping to the node IP addresses 325 of the primary site to determine the reachability of the nodes on the primary site, and then sends pings to each of the NAS servers of the primary site to determine the reachability of the NAS servers on the primary site (instructions 910).

If the health monitor does not receive any ping responses, the health monitor determines existence of a disaster at the primary site and control is passed to the disaster recovery module 360. The disaster recovery module 360 obtains the list of RDF sessions from the replication configuration builder and performs failover of all RDF sessions to be implanted in parallel (instructions 915).

In some instances, a large number of storage systems are already deployed and operating to implement replication data facilities 150. To enable the functionality described herein to be deployed to the installed base of operating storage systems, in some embodiments the deployment script 500 is used to install the RDF health monitor and disaster recovery system 315 to the cluster management stack 300 of each of the storage systems. Once a particular storage system has been upgraded to incorporate the RDF health monitor and disaster recovery system 315, the RDF health monitor and disaster recovery system 315 can be used to detect primary site failure on any replication data facility 150 where the updated storage system is operating as a destination site R2. Further, when a disaster is determined at a primary site, the destination site is able to automate failover to the destination site on the replication data facility.

Since all operations associated with detecting disaster of the primary site and automating failover to the destination site occur on the updated destination site, the system is backward compatible and works in situations where the primary site has not been upgraded to include a corresponding software module.

FIGS. 10 and 11 contain tables showing prophetic example comparisons between detecting disaster and implementing failover using an existing external monitoring system, that implements recovery using the process shown on the left-hand side of FIG. 8, with a process of implementing failover using the RDF health monitor and failover manager described herein, that implements recovery using the process shown on the right-hand side of FIG. 8.

In the example shown in FIG. 10, it is assumed that there are 4 current RDF sessions on a replication data facility. It is further assumed that, because the external monitoring system is a third component running outside of an array, the timing of detection may vary based on the network reliability and the high availability of the external monitoring system. For example, because the external monitoring system is external to the arrays, it may experience errors due to network issues, external host unavailability, etc. In this example it is assumed that it will take 5 minutes for the external monitoring system to detect disaster of the primary site and to initiate disaster recovery at the destination site after occurrence of the disaster at the primary array R1. Once disaster recovery has started, since the disaster recovery instructions are required to be input to the destination site array via the management interface on the destination site, recovery using the external monitoring system takes 26 seconds. Accordingly, in this example, the total return to operation time for the external monitor system is 326 seconds.

The RDF health monitor and failover manager, by contrast, is assumed to be able to detect disaster at the primary array R1 and initiate disaster recovery at the destination site within seconds of failure, for example by detecting the group of RDF session as having a session status of partitioned, and then quickly determining a lack of reachability of the set of IP addresses 350 associated with the replication data facility. Further, since the failover manager is installed in the destination array R2 and is able to use the APIs on the R2 array to implement failover of all of the RDF sessions in parallel while bypassing the user interface and management layers, the recovery time is much shorter. Accordingly, in the example shown in FIG. 10, the recovery time is 14 seconds and the total return to operation time of the RDF health monitor and failover manager is on the order of 16 seconds, which is much faster than the external monitoring system. It should be noted that even if the external monitoring system didn't take a full five minutes to initiate recovery after occurrence of the disaster at the primary site, the described RDF health monitor and failover manager is still significantly faster at implementing failover once the disaster recovery commences.

FIG. 11 is similar to FIG. 10, but shows a prophetic example where there are 10 current RDF sessions on the replication data facility. In this example, the amount of time required to initiate recovery after occurrence of the disaster at the primary site was assumed to be the same as in FIG. 10. The amount of time it took to recover from the disaster (disaster recovery time–disaster start time) was still significantly shorter for the RDF health monitor and failover manager (28 seconds) than the external monitor (41 seconds).

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of detecting primary site failure and automating failover to a destination site on a replication data facility, comprising:
   generating a replication data facility configuration file by the destination site, the replication configuration file containing information about the replication data facility, the replication data facility including the primary site, the destination site, and a plurality of replication data facility links facilitating transmission of data from the primary site and destination site, the primary site including a cluster of nodes, each node implementing one or more Network Attached Storage (NAS) servers associated with the replication data facility;
   using the information about the replication data facility from the replication data configuration file to monitor a plurality of health indicators of the replication data facility, by a health monitor implemented as part of a cluster management stack on the destination site, to detect the primary site failure on the replication data facility; and
   in response to detecting the primary site failure on the replication data facility, using the replication data facility configuration file, by a failover manager on the destination site, to implement automated parallel failover of each of the NAS servers associated with the replication data facility to the destination site.

2. The method of claim 1, wherein the replication data facility includes a plurality of RDF sessions, each RDF session being associated with a respective NAS server on the primary site, and the information about the replication data facility included in the replication data configuration file includes an identity of each of the plurality of RDF sessions.

3. The method of claim 2, wherein implementing automated parallel failover of each of the NAS servers comprises starting a corresponding NAS server for each of the RDF sessions of the replication data facility on the destination site.

4. The method of claim 2, wherein the plurality of health indicators comprise a respective RDF session status of each of the plurality of RDF sessions identified in the replication data configuration file.

5. The method of claim 4, wherein the step of monitoring the plurality of health indicators to detect the primary site failure comprises monitoring the respective RDF session status for each of the plurality of RDF sessions identified in the replication data configuration file and determining a possible failure at the primary site if the RDF session status of all of the plurality of RDF sessions is set to partitioned, in which the primary site and destination site are not able to communicate via any of the RDF sessions.

6. The method of claim 5, wherein the replication data configuration file includes a set of IP addresses, and in response to a determination that all of the plurality of RDF sessions identified in the replication data configuration file is set to partitioned, the step of monitoring the plurality of health indicators to detect the primary site failure comprises determining a reachability of each of the set of IP addresses at the primary site identified in the replication data configuration file.

7. The method of claim 6, wherein determining the reachability of the set of IP addresses identified in the replication data configuration file comprises sending a ping to each of the IP addresses of the set of IP addresses.

8. The method of claim 6, wherein the set of IP addresses identified in the replication data configuration file comprises a cluster master node IP address, a first set of node IP addresses, and a second set of NAS server IP addresses.

9. The method of claim 6, wherein the set of IP addresses identified in the replication data configuration file comprises a set of control network IP addresses and a set of NAS server IP addresses;
   wherein determining a reachability of the set of IP addresses at the primary site comprises first determining a reachability status of the set of control network IP addresses;
   in response to a determination that any one or more of the control network IP addresses are reachable, determining that the primary site is not experiencing disaster;
   only after determining that all of the control network IP addresses are not reachable, determining a reachability of the NAS server IP addresses;
   in response to a determination that any one or more of the NAS server IP addresses are reachable, determining that the primary site is not experiencing disaster; and
   only after determining that all of the NAS server IP addresses are not reachable, detecting the primary site failure.

10. The method of claim 9, wherein the control network IP addresses comprise a cluster master node IP address and a set of cluster node IP addresses;

wherein determining a reachability of the control network IP addresses at the primary site comprises first determining a reachability status of cluster master node IP address;
in response to a determination that cluster master node IP address is reachable, determining that the primary site is not experiencing disaster; and
only after determining that cluster master node IP address is not reachable, determining a reachability of the cluster node IP addresses.

11. A system for detecting primary site failure and automating failover to a destination site on a replication data facility, comprising:
one or more computers and one or more storage devices storing instructions that are operable, when executed by the one or more computers, to cause the one or more computers to perform operations comprising:
generating a replication data facility configuration file by the destination site, the replication configuration file containing information about the replication data facility, the replication data facility including the primary site, the destination site, and a plurality of replication data facility links facilitating transmission of data from the primary site and destination site, the primary site including a cluster of nodes, each node implementing one or more Network Attached Storage (NAS) servers associated with the replication data facility;
using the information about the replication data facility from the replication data configuration file to monitor a plurality of health indicators of the replication data facility, by a health monitor implemented as part of a cluster management stack on the destination site, to detect the primary site failure on the replication data facility; and
in response to detecting the primary site failure on the replication data facility, using the replication data facility configuration file, by a failover manager on the destination site, to implement automated parallel failover of each of the NAS servers associated with the replication data facility to the destination site.

12. The system of claim 11, wherein the replication data facility includes a plurality of RDF sessions, each RDF session being associated with a respective NAS server on the primary site, and the information about the replication data facility included in the replication data configuration file includes an identity of each of the plurality of RDF sessions.

13. The system of claim 12, wherein implementing automated parallel failover of each of the NAS servers comprises starting a corresponding NAS server for each of the RDF sessions of the replication data facility on the destination site.

14. The system of claim 12, wherein the plurality of health indicators comprise a respective an RDF session status of each of the RDF sessions identified in the replication data configuration file.

15. The system of claim 14, wherein the step of monitoring the plurality of health indicators to detect the primary site failure comprises monitoring the respective RDF session status for each of the plurality of RDF sessions identified in the replication data configuration file and determining a possible failure at the primary site if the RDF session status of all of the plurality of RDF sessions is set to partitioned in which the primary site and destination site are not able to communicate via any of the RDF sessions.

16. The system of claim 15, wherein the replication data configuration file includes a set of IP addresses, and in response to a determination that all of the plurality of RDF sessions identified in the replication data configuration file is set to partitioned, the step of monitoring the plurality of health indicators to detect the primary site failure comprises determining a reachability of each of the set of IP addresses at the primary site identified in the replication data configuration file.

17. The system of claim 16, wherein determining the reachability of the set of IP addresses identified in the replication data configuration file comprises sending a ping to each of the IP addresses of the set of IP addresses.

18. The system of claim 16, wherein the set of IP addresses identified in the replication data configuration file comprises a cluster master node IP address, a first set of node IP addresses, and a second set of NAS server IP addresses.

19. The system of claim 16, wherein the set of IP addresses identified in the replication data configuration file comprises a set of control network IP addresses and a set of NAS server IP addresses;
wherein determining a reachability of the set of IP addresses at the primary site comprises first determining a reachability status of the set of control network IP addresses;
in response to a determination that any one or more of the control network IP addresses are reachable, determining that the primary site is not experiencing disaster;
only after determining that all of the control network IP addresses are not reachable, determining a reachability of the NAS server IP addresses;
in response to a determination that any one or more of the NAS server IP addresses are reachable, determining that the primary site is not experiencing disaster; and
only after determining that all of the NAS server IP addresses are not reachable, detecting the primary site failure.

20. The system of claim 19, wherein the control network IP addresses comprise a cluster master node IP address and a set of cluster node IP addresses;
wherein determining a reachability of the control network IP addresses at the primary site comprises first determining a reachability status of cluster master node IP address;
in response to a determination that cluster master node IP address is reachable, determining that the primary site is not experiencing disaster; and
only after determining that cluster master node IP address is not reachable, determining a reachability of the cluster node IP addresses.

* * * * *